United States Patent [19]

Ritts

[11] Patent Number: 5,182,533

[45] Date of Patent: Jan. 26, 1993

[54] MAGNETICALLY LEVITATED SPINNING AXEL DISPLAY APPARATUS

[75] Inventor: Gary Ritts, Los Angeles, Calif.

[73] Assignee: CSD, Inc., Carson City, Nev.

[21] Appl. No.: 775,286

[22] Filed: Oct. 11, 1991

[51] Int. Cl.$^5$ ............................................. H02K 7/09
[52] U.S. Cl. .................................... 335/306; 310/90.5
[58] Field of Search .............. 335/302, 306; 310/90.5; 40/426; 104/283, 286; 446/129, 130, 131, 132, 133, 134, 135, 137, 138, 139

[56] References Cited

U.S. PATENT DOCUMENTS

| | | | |
|---|---|---|---|
| 2,340,122 | 1/1944 | Hansen | 310/90.5 |
| 2,351,424 | 6/1944 | Hansen | 310/90.5 |
| 2,582,788 | 1/1952 | Mendelsohn | 310/90.5 |
| 2,725,266 | 11/1955 | Mendelsohn | 310/90.5 |
| 2,747,944 | 5/1956 | Baermann | 310/90.5 |
| 3,196,566 | 7/1965 | Littlefield | 40/426 |
| 3,243,238 | 3/1966 | Lyman | 310/90.5 |
| 3,493,274 | 2/1970 | Emslie | 310/90.5 |
| 3,614,181 | 10/1971 | Meeks | 310/90.5 |
| 4,178,707 | 12/1979 | Littlefield | 40/426 |
| 4,382,245 | 5/1983 | Harrigan | 335/306 |
| 4,486,729 | 12/1984 | Lee | 335/306 |
| 5,043,615 | 8/1991 | Oshima | 310/90.5 |

Primary Examiner—Leo P. Picard
Assistant Examiner—Raymond Barrera

Attorney, Agent, or Firm—Thomas C. Feix; Jacques M. Dulin

[57] ABSTRACT

A magnetically levitated spinning axle display apparatus having a base assembly and an axle assembly. The base assembly includes a base platform member having a plurality of base magnets that are disposed spaced apart along an upper surface thereof. The platform member has an upstanding wall forming an axle support member disposed at one end. The axle assembly includes a plurality of disc shaped magnets disposed spaced apart along the rod and coordinate with individual ones of the base magnets when a first or second rod end portion is engaged in abutting contact with the upstanding axle support member. The polarity configurations of the rod magnets and the base magnets are repulsive to one another to permit free floating levitation of the rod above the base and to generate a longitudinal lateral force sufficient to keep a rod end contacted with the upstanding axle support. A plurality of alternate embodiments are created through varying the shape configurations and polarity configurations for both the rod and base magnets. In another alternate embodiment, a single ring magnet is provided to the rod which is repulsed by a coordinate base magnet disposed along an upper surface of a base member. An upstanding axle support including a bore hole is provided to engage a pointed end of the rod to maintain the axle in a horizontally levitating position.

20 Claims, 2 Drawing Sheets

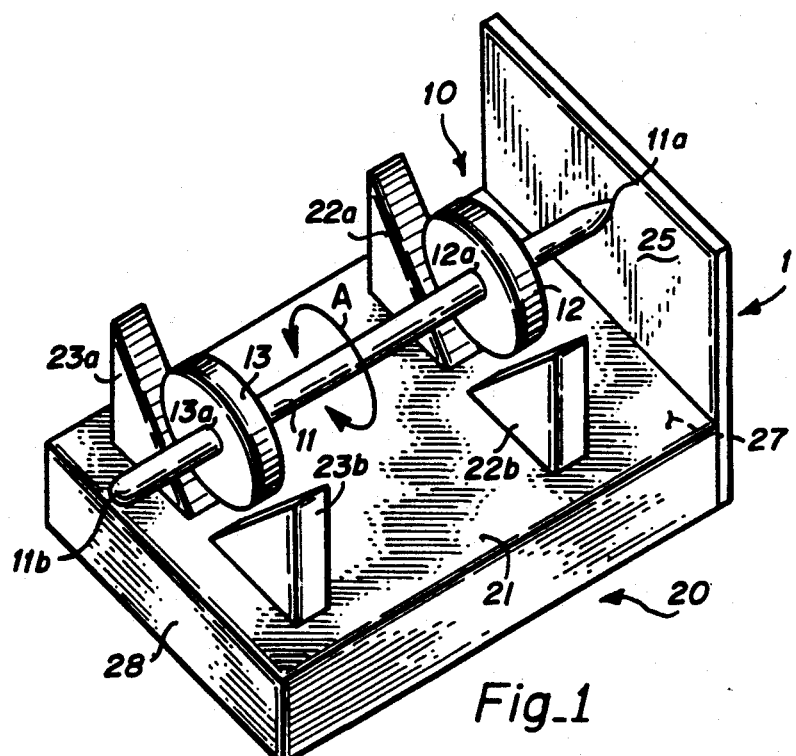
Fig_1
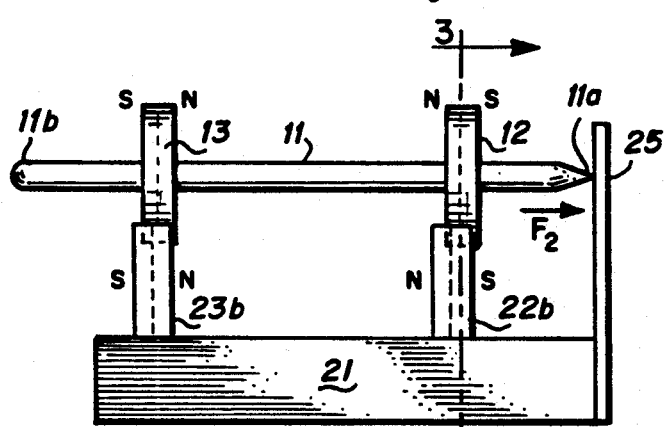
Fig_2
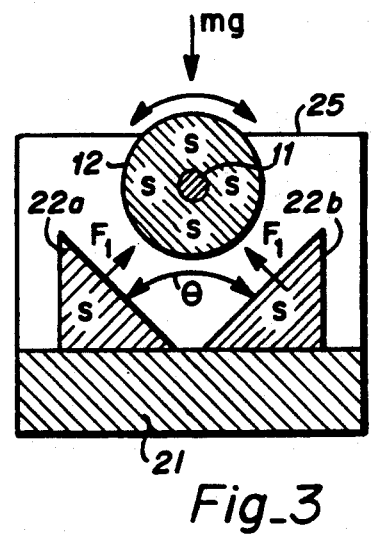
Fig_3
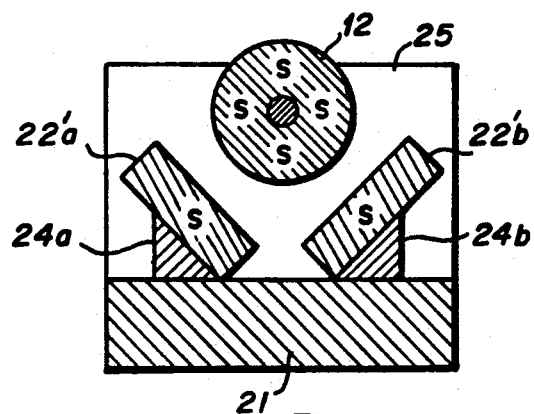
Fig_3A

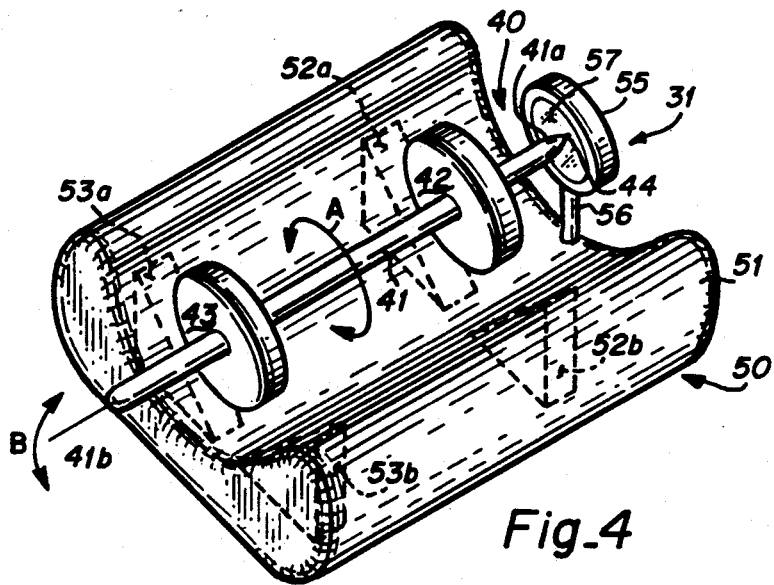
Fig.4
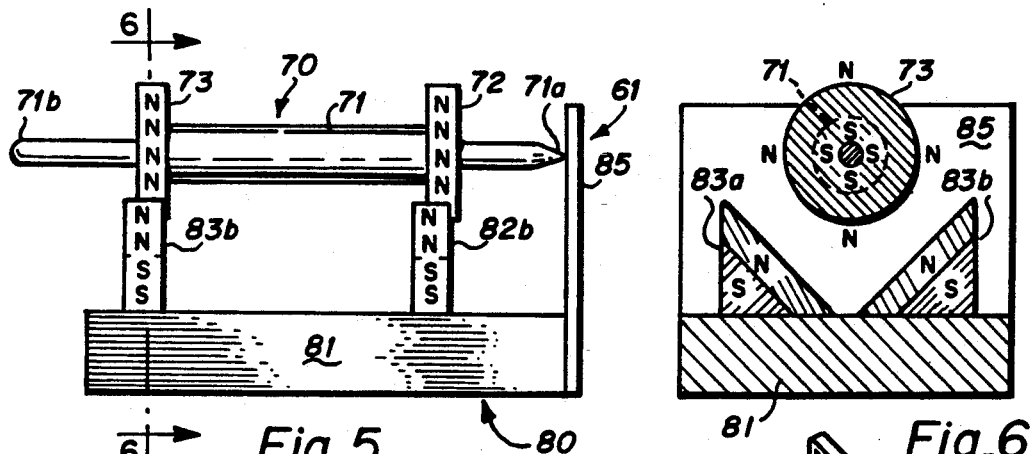
Fig.5
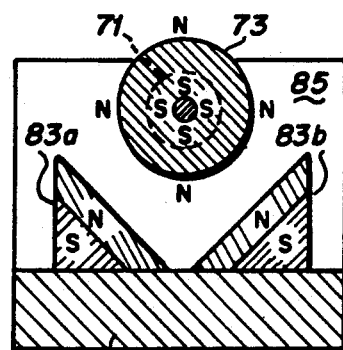
Fig.6
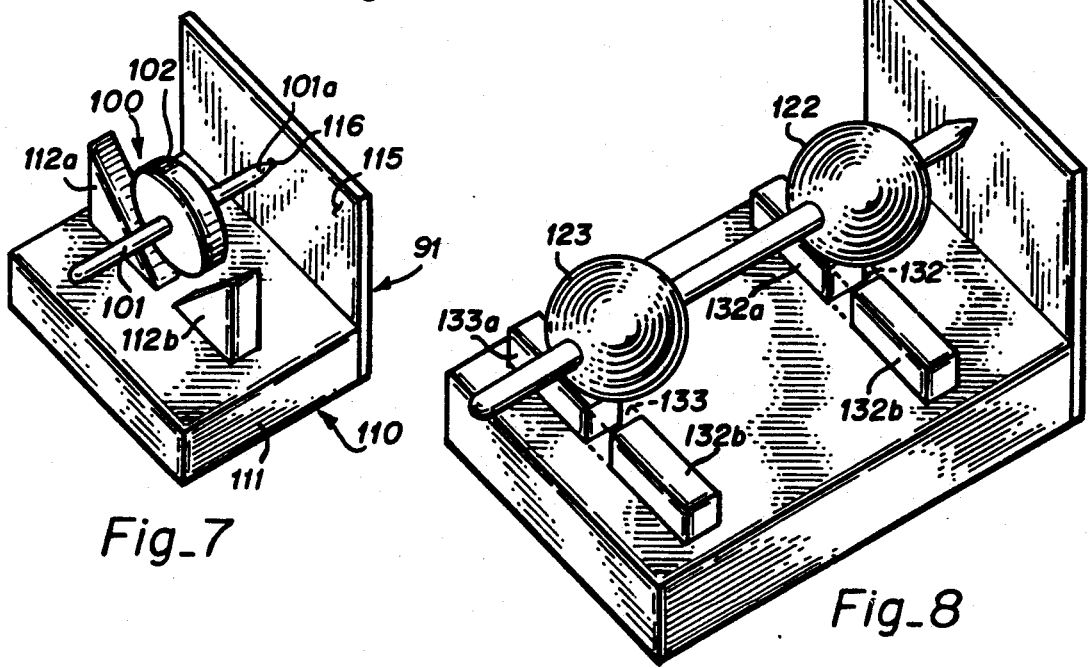
Fig.7
Fig.8

MAGNETICALLY LEVITATED SPINNING AXEL DISPLAY APPARATUS

FIELD

The present invention relates generally to an educational and amusement device. More particularly, the present invention relates to a novelty toy or scientific demonstrator of the type wherein an axle member is provided with a pair of spaced apart magnets and is positioned over a platform having a plurality of base magnets disposed along an upper platform surface and wherein the base magnets are polarized to maintain the axle member in a levitated state while having one end abutting an axle support member. The magnetically levitated axle member may be oscillated or rotated about its longitudinal axis in a near-frictionless state for prolonged periods of time.

BACKGROUND

It is known in the art to provide a display apparatus which employs magnetic forces to levitate a magnetically charged object to give the illusion of free flight. One such example display apparatus is disclosed in U.S. Pat. No. 4,178,707 (Littlefield), wherein a first base magnet is polarized, having a uniform polarity along an upper surface, to magnetically repulse a second magnetically charged object, such as a golf ball, model airplane, football, or like novelty item. The magnetic material associated with the object is polarized so that like pole surfaces of both the base magnet and the object magnet are faced together to simulate a stable condition of free flight of the object. A tether or a like restraining means is used to anchor the object to prevent the opposing magnetic forces from becoming unbalanced, thus causing the object to fall or crash. The display features of this apparatus are limited to a static display condition and an oscillatory condition of limited duration due to the existence of magnetic friction forces and tether induced friction forces. Only slight movement of the object through vibration may be experienced.

Another example of a levitation device is disclosed in U.S. Pat. No. 4,382,245 (Harrigan) wherein a magnetized top assembly is levitated over a concave upward base magnet of opposite polarity. The top assembly may be rotated about its vertical axis and maintained in a levitated state for time periods up to 5 minutes before it ceases to rotate further and crashes to the ground.

Accordingly, there is a need for a novel magnetically levitated display apparatus, which in addition to simulation of free flight, also demonstrates the scientific principles of magnetism, momentum of rotational inertia, frictional forces, and the effects of natural harmonic frequencies on the levitated object.

There is also a need for a magnetically levitated display apparatus which may oscillate or undergo rotation in a near frictionless condition for prolonged periods of time.

THE INVENTION

Objects

It is a principal object of the present invention to provide a magnetically levitated axle display apparatus which is capable of spinning in a near frictionless state for a prolonged period of time;

It is another object of the present invention to provide a magnetically levitated spinning axle display apparatus which may be used as a scientific demonstrator to illustrate the principles of magnetism, momentum of rotational inertia, the forces of friction, and the chaotic effects of natural harmonic frequencies;

It is another object of the present invention to provide a magnetically levitated spinning axle display apparatus which includes a single means for providing near frictionless support to one end of a spinning axle member; and Still further objects and advantages will become evident from the following drawings, detailed description and claims.

A BRIEF DESCRIPTION OF THE DRAWINGS

FIG. 1 is an isometric view of the magnetically levitated spinning axle display apparatus of the present invention;

FIG. 2 is a side elevation view of FIG. 1;

FIG. 3 is a cross-sectional view taken along the line and in the direction indicated by the Arrows 3—3 in FIG. 2;

FIG. 3A is a cross-sectional view as in FIG. 3, but illustrating an alternate configuration for the base magnets;

FIG. 4 is an isometric view of a second embodiment of the present invention;

FIG. 5 is a side elevation view of another alternate embodiment of the present invention illustrating the use of radially polarized magnets;

FIG. 6 is a cross-sectional view taken along the line and in the direction indicated by the Arrows 6—6 in FIG. 5;

FIG. 7 is an isometric view of another alternate embodiment of the invention illustrating a single spinning magnet configuration; and FIG. 8 is an isometric view of another alternate embodiment of the invention illustrating the variations of magnet shape configurations.

SUMMARY

The invention comprises a magnetically levitated spinning axle display apparatus comprising two main components, including a first axle assembly and a second base member assembly.

In the principal embodiment, the base assembly includes a base platform having a pair of base magnet assemblies disposed along an upper surface thereof and having an upstanding wall or like stop member connected to a first end portion thereof for support of a first wall contacting end of a levitating rod member.

The axle assembly comprises a rod member having a pair of ring magnets disposed spaced apart and aligned coordinate with each of the base magnets when the first rod end is abutted against the upstanding wall of the base platform. This contact defines a single axle support for the rod. The disc shaped rod magnets are polarized along their circular end faces. The base magnets are disposed coordinate with each individual disc shaped rod magnet and are similarly polarized along their forward and rear facing ends to provide the necessary repulsive force to levitate the rod above the platform.

In a preferred embodiment each base magnet assembly is configured as two spaced apart triangular magnets disposed an equal lateral distance from the center line which defines the longitudinal axis of the rod and are angled upwardly from the longitudinal centerline at 45° to form a magnetic cup for the ring magnets. The ring magnets may be selectively positioned along the rod so that their transverse mid-sectional polarity dividing planes are located just forward of the pole surface dividing plane of their respective base magnet assemblies in order to provide the inward lateral force needed to maintain the rod member end in engagement with the upstanding axle support wall.

I have found that by using the above shape and polarity configurations for the rod magnets and base magnets and by facing like pole surfaces of each ring magnet toward one another, drag forces caused by magnetic friction are substantially reduced and axial spin times on the order of 30-31 minutes may be achieved.

In an alternate embodiment, the disc shaped rod magnets are polarized radially, whereby a first pole surface is associated with a disc core portion and the opposing pole surface is associated with the outer perimeter shell portion of the disc. In this embodiment the base magnets are similarly polarized so that the upward facing surface of each base magnet has a polarity to repulse the outer shell perimeter portion of the disc magnet disposed thereover.

Other alternate embodiments include implementation of various shape configurations for both the rod magnets and the base magnets. For example, in addition to a disc shape configuration, the rod magnets may also be spherical or any other desired configuration. The differently shaped magnet configurations may also be polarized along a dividing plane transverse to the longitudinal rod axis as in the preferred embodiment, or polarized radially, as in the previously described alternate embodiment. Similarly, in addition to triangular magnets, alternate shape configurations for the base magnets may include flat bar magnets or rectangular magnets supported at an angle selected from a range of angles. Moreover, each angle of inclination of each base magnet pair need not be equal to one another.

In another alternate embodiment, a rod having only a single disc shaped rod magnet is levitated above a base platform, which includes a single pair of base magnets disposed along an upper surface thereof and coordinate with the rod magnets when the first rod end is disposed in engagement with an upstanding axle support, as before. The axle support/upstanding wall also includes a bore hole for receiving a pointed end of the rod first end to fix the axis of spin for the levitating rod member. This form of axle support is necessary, since a second pair of rod and base magnets are not provided to balance the system.

DETAILED DESCRIPTION OF THE BEST MODE

The following detailed description illustrates the invention by way of example, not by way of limitation of the principles of the invention. This description will clearly enable one skilled in the art to make and use the invention, and describes several embodiments, adaptations, variations, alternatives and uses of the invention, including what I presently believe is the best mode of carrying out the invention.

A magnetically levitated spinning axle display apparatus constructed in accordance with one embodiment of the present invention is indicated generally by the reference numeral 1 in FIG. 1.

The magnetically levitated spinning axle display apparatus 1 comprises two principal assemblies, including a base assembly 20 and an axle assembly 10.

The base assembly 20 includes a base or platform member 21 having a first front end portion 27 and a second rear end portion 28. An axle support 25 is disposed integral with the front end portion 27 and is formed as an upstanding end wall. The upper surface of the base or platform member 21 has disposed adjacent the front end portion 27, a pair of base magnets 22a and 22b and a corresponding rearwardly disposed pair of base magnets 23a and 23b.

In the preferred embodiment, all four magnets are securely mounted to the base member 21 and are equal in size and magnetic strength. The base magnets are preferably angled upward as shown to provide a "magnetic cup" for the levitating axle assembly 10. The preferred angle of inclination for each magnet face is about 45°, but it is understood that this angle of inclination may be varied to alternately raise or lower the height of the levitating axle assembly 10. The preferred angle of base magnet inclination may be achieved through the use of triangular shaped magnets 22a, 22b and 23a, 23b as shown in FIGS. 1-3 or by simply tilting flat rectangular magnets at a desired angle. FIG. 3A shows rectangular base magnets 22'a and 22'b tilted to a 45° angle by supports 24a and 24b.

The axle assembly 10 comprises a rod or axle member 11 having a pair of ring magnets 12 and 13 disposed spaced apart thereon. Each ring magnet 12 and 13 includes a central through-hole 12a, 13a of a diameter sufficient to permit a tight fit insertion of the rod 11 therethrough. The through holes 12a, 13a are also sized to permit the ring magnets 12 and 13 to be slidably positioned along the rod 11 in a number of locations. In the preferred embodiment the forward ring magnet 12 is positioned along the rod 11 so that as the rod end 11a contacts the axle support 25, the forward ring magnet 12 is disposed to coordinate with the forward base magnets 22a and 22b. Similarly, rear ring magnet 13 is positioned along the rod such that it is disposed to coordinate with base magnets 23a and 23b. In each embodiment, the polarities of the coordinate rod and base magnets are opposed to levitate the axle assembly as shown in FIGS. 1-8.

In the preferred embodiment the ring magnets 12 and 13 are of equal size and dimension, so that as the axle is rotated in the direction of Arrow A, the spinning rod 11 is substantially horizontal. It is understood that either ring magnet may be of a different size and/or dimension from the other. Where one ring magnet is larger in diameter than the other ring magnet, the two ring magnets have different moments of inertia, and thus the rod 11 spins in a generally tilted position. Also, a precession of the rod end 11a about the point of contact with axle support 25 would be noticeable.

FIG. 2 shows the preferred orientation of the magnet polarities for ring magnets 12, 13 and base magnets 22b and 23b (the polarities for base magnets 22a and 23a are oriented the same as base magnets 22b and 23b). Each ring magnet 12 and 13 has a uniform polarity either north facing, N, or south facing, S, along their circle faces. The magnet center or polarity dividing line (shown in phantom) of each ring magnet 12 and 13 is preferably disposed slightly forward of the corresponding polarity dividing line of base magnets 22a, 22b and 23a, 23b, respectively. In this manner, the corresponding north and south facing pole surfaces of ring magnet 12 and base magnets 22a and 22b repulse each other with a minimum magnetic friction in order to levitate the rod 11 while permitting a sufficient lateral force F2 to exist in order to maintain contact of the tip end 11a against axle support 25. This lateral force F2 is a result of the attraction of the north facing pole surface of ring magnet 12 with the south facing pole surface of base magnets 22a and 22b. Similarly, the north and south facing pole surfaces of ring magnet 13 are positioned over the north and south facing polarities of base magnets 23a and 23b. To increase or decrease the lateral force of F2 (and hence increase or decrease rotational friction), ring magnet 13 may be moved forward or backward along the rod 11, such that its midportion is positioned just forward or rearward of the corresponding midportions of rear base magnets 23a and 23b.

It should be noted that in the polarity configurations shown in FIGS. 1-3, wherein like pole surfaces of the ring magnets 12 and 13 are facing each other (i.e., in this example, north pole of magnet 12 faces north pole of magnet 13), a minimum amount of magnetic friction forces (i.e., attraction forces) are present so that the axle assembly 10 may be spun in a near frictionless state about its longitudinal axis for a prolonged period of time on the order of up to 30-31 minutes. Rotational motion may be imparted to the rod member 11 by using a forefinger and thumb to gently spin the rear end 11b of rod 11.

FIG. 3 shows a cross-section view of the polarity configuration of the magnets of FIG. 2. FIG. 3 also illustrates in greater detail, the "magnetic cup" formed by the balance of the magnetic force, mg, against the two equal, radially inwardly acting magnetic repulsion forces Fl associated with angled base magnets 22a and 22b, respectively. In this embodiment angle $\Theta$ is 90°. This corresponds to the preferred 45 angle of inclination for the base magnets 22a and 22b (and also 23a and 23b) discussed above. Thus, a summation of forces may be represented as:

$$\Sigma F = mg + 2F \sin 45° = 0$$

The magnetically levitated spinning axle device of this invention also permits the study of the lateral force F2 as affected by various positioning of the ring magnets 12 and 13 over their respective base magnets 22, 23. In addition to demonstrating the balance of forces at work in this device, the scientific principles of rotational inertia may be demonstrated, whereby the angular momentum can be calculated, in terms of moment of inertia and angular velocity of the spinning axle assembly through the formula:

$$M = I.$$

wherein M = angular momentum
I = moment of inertia; = angular velocity.

The magnetically levitated spinning axle of this invention may also be operated in a vibrational or oscillatory mode, in addition to the spinning mode. Oscillation may be induced by depressing and releasing rod end 11b while the axle assembly 10 is initially in its static levitated state. A precessional movement may also develop in an elliptical mode of oscillation and thereby provide further opportunity for scientific demonstration and study.

FIGS. 4 and 5 show alternate embodiments for the magnetically levitated spinning axle display apparatus of the present invention. As is seen in FIG. 4, the base assembly 50 is modified and includes an upper surface formed in the shape of a trough to receive the spinning axle assembly 40. The base magnets 52a, 52b and 53a, 53b are disposed internal of the base member 50 and are positioned to magnetically repulse ring magnets 42 and 43 of the axle assembly as before.

The base assembly 50 also includes a modified axle support 55 which is spaced from the center trough portion of base member 51 by a pole or stand 56. A contact surface 57 is also provided to the axle support 55 and is disposed to engage rod end 41a of the spinning axle assembly 40.

The materials of construction for the magnets are preferably ceramic magnets, but it is understood that any type of magnet may be used. The base member 21, rod 11 and axle support are preferably constructed of wood, plastic or any other non-magnetic material so as not to interfere with the magnetic levitating forces. Additionally, axle support 25 and rod end 11a are preferably formed of hardened material to minimize frictional forces associated with this contact area. As seen in the embodiment of FIG. 4, the axle support 55 may include a glass or steel contact surface and the rod end 41a may be provided with a metal needle tip 44.

FIGS. 5 and 6 show another alternate embodiment of the magnetically levitated spinning axle of the present invention. As in the preferred embodiment of FIGS. 1-3, this alternate embodiment 61 for the magnetically levitated spinning axle includes an axle assembly 70 and a base assembly 80. This embodiment also shows an alternate configuration for a rod 71 wherein the middle portion has a larger diameter than the end portions 71b and 71a. As is best seen in FIGS. 5 and 6, the ring magnets 72 and 73 are polarized radially in the manner as shown, i.e., the southern pole surface is disposed at a radial core while the northern pole surface is disposed along the outer perimeter shell portion. Base magnets 82a, 82b and 83a, 83b are similarly polarized such that the north facing pole surface is disposed along the magnet surface facing the axle assembly and the south facing surface is disposed adjacent the outer perimeter bottom corners of each base magnet. As in the preferred embodiment of FIGS. 1-3, the four base magnets 82a, 82b, and 83a, 83b are equal in size and strength and are securely fixed to the base member 81. In addition, it is preferable to incline the axle assembly facing surface at a 45° to create a balanced, magnetically repulsive force reaching upward and radially inward to the axial center of each ring magnet. The distance between the individual right and left sides of each pair of magnets, for example, 82a and 82b may be varied over a limited range to provided a greater or lesser magnetic repulsive force to its corresponding ring magnet. It should be noted that magnetic friction forces are increased in this embodiment and that spinning time for the magnetically levitated axle is reduced.

FIG. 7 shows another alternate embodiment illustrating a single ring magnet and corresponding base magnet configuration. The single magnetically levitated spinning axle display apparatus 91 comprises a base assembly 110 and axle assembly 100. The base assembly includes a base platform member 111 having a pair of base magnets 112a and 112b securely attached to a top surface thereof. The base/platform member 111 also includes an axle support 115 as before.

The axle assembly 100 comprises a rod 101 having a single ring magnet 102 axially disposed thereon. The ring magnet 102 and the base magnets 112a and 112b may be polarized uniformly along side surfaces as in the embodiment shown in FIGS. 1-4 or may be radially polarized as shown in the alternate embodiment of FIGS. 5 and 6. The rod includes an axle support engaging end 101a having a fine point which is received in a bore hole 116 of axle support 115. The bore hole 116 is counter sunk to anchor the rod 101 with respect to the axle support 115 and further facilitates in the balanced levitation of the axle assembly over the base assembly 110. As before, the magnet 102 may be positioned just forward of the corresponding base magnets 112a and 112b to provide the necessary lateral supporting force. Spin times for this embodiment are significantly reduced in view of the friction forces associated with the rod end 101a and bore hole 116 contact.

FIG. 8 shows, by way of example only, yet another alternate embodiment wherein rod magnets 122, 123 are spherical in shape and base magnets 132a, 132b and 133a, 133b are configured as flat bar magnets. The base magnets may also be formed as a single flat bar 132, 133 (or any single magnet configuration for that matter), but it is noted that a "magnetic cup" is not easily achieved by a single base magnet configuration.

It should be understood that various modifications within the scope of this invention can be made by one of ordinary skill in the art without departing from the spirit thereof. I therefore wish my invention to be defined by the scope of the appended claims in view of the specification as broadly as the prior art will permit.

I claim:

1. A magnetically levitated spinning axle display apparatus comprising in operative combination:
   a) a rod member having a first front end portion and a second rear end portion;
   b) a first plurality of magnets disposed spaced apart along said rod member, each of said rod magnets having an axial center aligned coordinate with a longitudinal axis of said rod member:
   c) a base member having a first front end portion and a second rear end portion;
   d) means for lateral support of only said rod first front end portion, said lateral support means disposed adjacent said base member front end portion; and
   e) said base member having a second plurality of magnets disposed spaced apart adjacent an upper surface thereof, each of said second plurality of magnets having a polarity oriented to repulse the polarity of said first plurality of magnets, said second plurality of magnets selectively disposed in substantially coordinate alignment with selected ones of said first plurality of magnets to permit said rod to spin about its longitudinal axis in a levitated state above said base member for prolonged periods with a minimum of drag associated with magnetic frictional forces and rod first end support frictional forces.

2. A magnetically levitated spinning axle display apparatus as in claim 1 wherein:
   a) said first plurality of rod magnets is a pair of magnets including a first rod magnet disposed adjacent said rod front end portion and a second rod magnet disposed adjacent said second rod rear end portion wherein:
      i) each of said first and second rod magnets being polarized horizontally through a center dividing plane transverse to said longitudinal axis of said rod member to define a front and rear polarized half portions for each rod magnet;
      ii) said second rod magnet having its forward facing half portion polarized repulsive to a rear facing half portion or said first rod magnet;
   b) said second plurality of magnets is a pair of base magnet assemblies including a first base magnet assembly disposed beneath said first rod magnet and a second base magnet assembly disposed beneath said second rod magnet wherein:
      i) said first base magnet assembly has a polarity configuration identical to said first rod magnet; and
      ii) said second base magnet assembly has a polarity configuration identical to said second rod magnet.

3. A magnetically levitated spinning axle display apparatus as in claim 2 wherein:
   a) said lateral support means includes an upstanding hard flat surface;
   b) said rod first end portion having a pointed tip to permit near frictionless contact with said hard flat surface; and
   c) said rod first end lateral force being adjustable upon the lateral positioning of said transverse polarity center dividing planes of each of said rod magnets relative to corresponding transverse center dividing planes of each of said base magnets.

4. A magnetically levitated spinning axle display apparatus as in claim 3 wherein said first plurality of magnets are disc shaped members.

5. A magnetically levitated spinning axle display apparatus as in claim 4 wherein said base magnet assemblies are flat bar magnets.

6. A magnetically levitated spinning axle display apparatus as in claim 4 wherein:
   a) each of said front and rear base magnet assemblies includes a first and second magnet disposed spaced apart along either side of said longitudinal axis; and
   b) said rod facing surfaces of each of said first and second magnets are oriented at an incline to form a magnetic cup for said rod magnets.

7. A magnetically levitated spinning axle display apparatus as in claim 3 wherein said rod magnets are spheres.

8. A magnetically levitated spinning axle display apparatus as in claim 7 wherein said base magnet assemblies are flat bar magnets.

9. A magnetically levitated spinning axle display apparatus as in claim 7 wherein:
   a) each of said front and rear base magnet assemblies include a first and second magnet disposed spaced apart along either side of said longitudinal axis; and
   b) said rod facing surfaces of each of said first and second magnets are oriented at an incline to form a magnetic cup for said rod magnets.

10. A magnetically levitated spinning axle display apparatus as in claim 1 wherein:
    a) said first plurality of magnets is a pair of magnets including a first rod magnet disposed adjacent said rod front end and a second rod magnet disposed adjacent said second rod end;
    b) each of said first and second rod magnets being polarized radially from a center core portion to an outer perimeter shell portion;
    c) said second plurality of magnets is a pair of base magnet assemblies including a first base magnet assembly disposed beneath said first rod magnet and a second base magnet assembly disposed beneath said second rod magnet; and
    d) each of said first and second base magnet assemblies having a polarity configuration repulsive to said polarity configuration associated with a coordinate outer perimeter shell portion of each of said rod magnets.

11. A magnetically levitated spinning axle display apparatus as in claim 10 wherein:
   a) said lateral support means includes a hard flat surface oriented perpendicular said rod first end portion;
   b) said rod first end portion having a pointed tip to permit near frictionless contact with said hard flat surface; and
   c) said rod first end lateral force being adjustable upon the lateral positioning of said first and second rod magnets relative to their corresponding base magnet assemblies.

12. A magnetically levitated spinning axle display apparatus as in claim 11 wherein said first and second rod magnets are disc shaped members.

13. A magnetically levitated spinning axle display apparatus as in claim 12 wherein said base magnet assemblies are flat bar magnets.

14. A magnetically levitated spinning axle display apparatus as in claim 12 wherein:
   a) each of said front and rear base magnet assemblies includes a first and second magnet disposed spaced apart along either side of said longitudinal axis; and
   b) said rod facing surfaces of each of said first and second magnets oriented at an incline to form a magnetic cup for said rod magnets.

15. A magnetically levitated spinning axle display apparatus as in claim 11 wherein said rod magnets are spheres.

16. A magnetically levitated spinning axle display apparatus as in claim 15 wherein said base magnet assemblies are flat bar magnets.

17. A magnetically levitated spinning axle display apparatus as in claim 15 wherein:
   a) each of said front and rear base magnet assemblies includes a first and second magnet disposed spaced apart along either side of said longitudinal axis; and
   b) said rod facing surfaces of each of said first and second magnets oriented at an incline to form a magnetic cup for said rod magnets.

18. A magnetically levitated spinning axle display apparatus comprising in operative combination:
   a) a rod member having a first front end portion and a second rear end portion;
   b) said rod member having a magnet disposed axially mounted along a midportion thereof;
   c) a base member having a first front end portion and a second rear end portion;
   d) said base member having a base magnet assembly disposed along an upper surface thereof, said base magnet assembly polarized to repulse said magnet mounted on said rod member; and
   e) means for lateral support of only said rod first front end portion, said lateral support means for keeping said rod member in a substantially horizontal levitated state as an axially rotational movement is imparted to said rod member.

19. A magnetically levitated spinning axle display apparatus as in claim 18 wherein:
   a) said lateral support means includes an upstanding flat surface having a bore hole disposed thereon;
   b) said rod first end portion having a pointed tip to permit near frictionless engagement with said bore hole; and
   c) said rod first end lateral force being adjustable upon the lateral positioning of said transverse polarity center dividing planes of each of said rod magnets relative to corresponding transverse center dividing planes of each of said base magnets.

20. A magnetically levitated spinning axle display apparatus as in claim 19 wherein:
   a) said rod magnet is a disc shaped member;
   b) said base magnet assembly includes a pair of side by side inclined magnets oriented to form a magnetic cup for said rod magnet.

* * * * *